United States Patent
Petersen

(10) Patent No.: US 9,973,462 B1
(45) Date of Patent: May 15, 2018

(54) METHODS FOR GENERATING MESSAGE NOTIFICATIONS

(71) Applicant: Google Inc., Mountain View, CA (US)

(72) Inventor: Morten Just Petersen, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 387 days.

(21) Appl. No.: 14/058,616

(22) Filed: Oct. 21, 2013

(51) Int. Cl.
*G06F 15/16* (2006.01)
*H04L 12/58* (2006.01)

(52) U.S. Cl.
CPC .................................. *H04L 51/24* (2013.01)

(58) Field of Classification Search
CPC ......... H04L 29/06; H04L 67/36; H04L 51/22; H04L 63/1433; H04L 51/04; H04L 12/581; H04L 51/32; H04L 51/24; G06F 2203/04803; G06F 3/0481; G06Q 10/107; G06Q 10/10; H04W 4/12; H04M 1/7255
See application file for complete search history.

(56) References Cited

U.S. PATENT DOCUMENTS

| | | | |
|---|---|---|---|
| 4,694,406 A | 9/1987 | Shibui et al. | |
| 4,853,878 A | 8/1989 | Brown | |
| 5,038,138 A | 8/1991 | Akiyama et al. | |
| 5,175,813 A | 12/1992 | Golding et al. | |
| 5,317,306 A | 5/1994 | Abraham et al. | |
| 5,361,361 A | 11/1994 | Hickman et al. | |
| 5,394,523 A | 2/1995 | Harris | |
| 5,398,310 A | 3/1995 | Tchao et al. | |
| 5,506,951 A | 4/1996 | Ishikawa | |
| 5,526,480 A | 6/1996 | Gibson | |
| 5,563,996 A | 10/1996 | Tchao | |
| 5,610,828 A | 3/1997 | Kodosky et al. | |
| 5,623,613 A | 4/1997 | Rowe et al. | |
| 5,732,399 A | 3/1998 | Katiyar et al. | |
| 5,737,553 A | 4/1998 | Bartok | |
| 5,812,123 A | 9/1998 | Rowe et al. | |
| 5,826,241 A | 10/1998 | Stein et al. | |

(Continued)

FOREIGN PATENT DOCUMENTS

| CN | 1194703 | 9/1998 |
|---|---|---|
| CN | 1285557 | 2/2001 |

(Continued)

OTHER PUBLICATIONS

How to Use Outlook Express, UCLA, Jan. 11, 2008, available at ,http://web.archive.org/web/20080111060000/http://www.bol.ucla.edu/software/win/oe/.

(Continued)

*Primary Examiner* — Aftab N. Khan
*Assistant Examiner* — Anh Nguyen
(74) *Attorney, Agent, or Firm* — Young Basile Hanlon & MacFarlane, P.C.

(57) ABSTRACT

A method includes accessing, by one or more computers, a message; identifying, at the one or more computers and based on information contained in the message, at least one topic related to the message; identifying, at the one or more computers, a graphical topic indicator based on the at least one topic; and outputting, by the one or more computers and for display, a visual notification regarding the message, wherein the visual notification includes the graphical topic indicator.

14 Claims, 10 Drawing Sheets

(56) References Cited

U.S. PATENT DOCUMENTS

| | | | |
|---|---|---|---|
| 5,870,770 A | 2/1999 | Wolfe | |
| 5,894,311 A | 4/1999 | Jackson | |
| 5,903,267 A | 5/1999 | Fisher | |
| 5,905,863 A | 5/1999 | Knowles et al. | |
| 5,948,058 A | 9/1999 | Kudoh et al. | |
| 5,999,159 A | 12/1999 | Isomura | |
| 5,999,179 A | 12/1999 | Kekic et al. | |
| 6,008,803 A | 12/1999 | Rowe et al. | |
| 6,026,388 A | 2/2000 | Liddy et al. | |
| 6,034,688 A | 3/2000 | Greenwood et al. | |
| 6,052,121 A | 4/2000 | Webster et al. | |
| 6,078,306 A | 6/2000 | Lewis | |
| 6,085,205 A | 7/2000 | Peairs et al. | |
| 6,088,696 A | 7/2000 | Moon et al. | |
| 6,154,740 A | 11/2000 | Shah | |
| 6,184,881 B1 | 2/2001 | Medl | |
| 6,246,996 B1 | 6/2001 | Stein et al. | |
| 6,252,597 B1 | 6/2001 | Lokuge | |
| 6,272,537 B1 | 8/2001 | Kekic et al. | |
| 6,289,361 B1 | 9/2001 | Uchida | |
| 6,300,967 B1 | 10/2001 | Wagner et al. | |
| 6,340,979 B1 | 1/2002 | Beaton et al. | |
| 6,348,935 B1 | 2/2002 | Malacinski et al. | |
| 6,380,947 B1 | 4/2002 | Stead | |
| 6,388,682 B1 | 5/2002 | Kurtzberg et al. | |
| 6,396,513 B1 | 5/2002 | Helfman et al. | |
| 6,424,995 B1 | 7/2002 | Shuman | |
| 6,442,440 B1 | 8/2002 | Miller | |
| 6,499,026 B1 | 12/2002 | Rivette et al. | |
| 6,529,744 B1 | 3/2003 | Birkler et al. | |
| 6,549,218 B1 | 4/2003 | Gershony et al. | |
| 6,563,518 B1 | 5/2003 | Gipalo | |
| 6,582,474 B2 | 6/2003 | LaMarca et al. | |
| 6,628,996 B1 | 9/2003 | Sezaki et al. | |
| 6,631,398 B1 | 10/2003 | Klein | |
| 6,640,230 B1 | 10/2003 | Alexander et al. | |
| 6,700,591 B1 | 3/2004 | Sharpe | |
| 6,701,346 B1 | 3/2004 | Klein | |
| 6,738,787 B2 | 5/2004 | Stead | |
| 6,782,393 B1 | 8/2004 | Balabanovic et al. | |
| 6,980,977 B2 | 12/2005 | Hoshi et al. | |
| 6,990,452 B1 | 1/2006 | Ostermann et al. | |
| 7,003,736 B2 * | 2/2006 | Kanevsky | G06F 3/04817 |
| | | | 707/E17.121 |
| 7,073,129 B1 | 7/2006 | Robarts et al. | |
| 7,107,268 B1 | 9/2006 | Zawadzki et al. | |
| 7,117,445 B2 | 10/2006 | Berger | |
| 7,120,646 B2 | 10/2006 | Streepy, Jr. | |
| 7,127,476 B2 | 10/2006 | Narahara | |
| 7,137,074 B1 | 11/2006 | Newton et al. | |
| 7,139,800 B2 | 11/2006 | Bellotti et al. | |
| 7,209,246 B2 | 4/2007 | Suda et al. | |
| 7,243,125 B2 | 7/2007 | Newman et al. | |
| 7,262,772 B2 | 8/2007 | Ebert | |
| 7,295,995 B1 | 11/2007 | York et al. | |
| 7,320,105 B1 | 1/2008 | Sinyak et al. | |
| 7,395,507 B2 | 7/2008 | Robarts et al. | |
| 7,401,131 B2 | 7/2008 | Robertson et al. | |
| 7,421,664 B2 | 9/2008 | Wattenberg et al. | |
| 7,421,690 B2 | 9/2008 | Forstall et al. | |
| 7,428,579 B2 | 9/2008 | Libbey, IV et al. | |
| 7,441,194 B2 | 10/2008 | Vronay et al. | |
| 7,454,716 B2 | 11/2008 | Venolia | |
| 7,487,458 B2 | 2/2009 | Jalon et al. | |
| 7,505,974 B2 | 3/2009 | Gropper | |
| 7,512,901 B2 | 3/2009 | Vong et al. | |
| 7,523,126 B2 | 4/2009 | Rivette et al. | |
| 7,526,559 B1 | 4/2009 | Phillips | |
| 7,533,064 B1 | 5/2009 | Boesch | |
| 7,565,404 B2 | 7/2009 | Gwozdz | |
| 7,831,834 B2 | 11/2010 | Hickman et al. | |
| 7,836,391 B2 | 11/2010 | Tong | |
| 7,844,906 B2 | 11/2010 | Berger | |
| 7,904,387 B2 | 3/2011 | Geering | |
| 7,908,566 B2 | 3/2011 | Wilcox et al. | |
| 7,917,867 B2 | 3/2011 | Wattenberg et al. | |
| 7,921,176 B2 | 4/2011 | Madnani | |
| 8,073,910 B2 | 12/2011 | Tokuda et al. | |
| 8,150,928 B2 | 4/2012 | Fang | |
| 8,199,899 B2 | 6/2012 | Rogers et al. | |
| 8,281,247 B2 | 10/2012 | Daniell et al. | |
| 8,310,510 B2 | 11/2012 | Asahina | |
| 8,386,914 B2 | 2/2013 | Baluja et al. | |
| 8,527,011 B1 | 9/2013 | Bauer et al. | |
| 8,726,179 B2 | 5/2014 | Yerkes et al. | |
| 8,730,028 B2 * | 5/2014 | Putterman | G08B 27/008 |
| | | | 340/531 |
| 8,875,030 B1 | 10/2014 | Loverin et al. | |
| 9,143,468 B1 * | 9/2015 | Cohen | H04L 51/00 |
| 2001/0044741 A1 | 11/2001 | Jacobs et al. | |
| 2002/0004793 A1 | 1/2002 | Keith, Jr. | |
| 2002/0019827 A1 | 2/2002 | Shiman et al. | |
| 2002/0047868 A1 * | 4/2002 | Miyazawa | G06Q 10/109 |
| | | | 715/835 |
| 2002/0051015 A1 | 5/2002 | Matoba | |
| 2002/0073112 A1 | 6/2002 | Kariya | |
| 2002/0073157 A1 | 6/2002 | Newman et al. | |
| 2002/0080187 A1 | 6/2002 | Lawton | |
| 2002/0084991 A1 | 7/2002 | Harrison et al. | |
| 2002/0099775 A1 | 7/2002 | Gupta et al. | |
| 2002/0120702 A1 | 8/2002 | Schiavone et al. | |
| 2002/0120858 A1 | 8/2002 | Porter et al. | |
| 2002/0128047 A1 | 9/2002 | Gates | |
| 2002/0138834 A1 | 9/2002 | Gerba et al. | |
| 2002/0174183 A1 | 11/2002 | Saeidi | |
| 2002/0186252 A1 | 12/2002 | Himmel et al. | |
| 2002/0188689 A1 | 12/2002 | Michael | |
| 2002/0194280 A1 | 12/2002 | Altavilla et al. | |
| 2003/0014482 A1 | 1/2003 | Toyota et al. | |
| 2003/0101065 A1 | 5/2003 | Rohall et al. | |
| 2003/0120719 A1 | 6/2003 | Yepishin et al. | |
| 2003/0120762 A1 | 6/2003 | Yepishin et al. | |
| 2003/0146941 A1 | 8/2003 | Bailey et al. | |
| 2003/0154212 A1 | 8/2003 | Schirmer et al. | |
| 2003/0163537 A1 | 8/2003 | Rohall et al. | |
| 2003/0167310 A1 | 9/2003 | Moody et al. | |
| 2003/0182310 A1 | 9/2003 | Charnock et al. | |
| 2003/0191816 A1 | 10/2003 | Landress et al. | |
| 2003/0195963 A1 | 10/2003 | Song et al. | |
| 2003/0226152 A1 | 12/2003 | Billmaier et al. | |
| 2004/0046776 A1 | 3/2004 | Phillips et al. | |
| 2004/0058673 A1 | 3/2004 | Irlam et al. | |
| 2004/0068544 A1 | 4/2004 | Malik et al. | |
| 2004/0073616 A1 | 4/2004 | Fellenstein et al. | |
| 2004/0243926 A1 | 12/2004 | Trenbeath et al. | |
| 2004/0260756 A1 | 12/2004 | Forstall et al. | |
| 2004/0268265 A1 | 12/2004 | Berger | |
| 2005/0004989 A1 | 1/2005 | Satterfield et al. | |
| 2005/0066037 A1 | 3/2005 | Song et al. | |
| 2005/0108345 A1 | 5/2005 | Suzuki | |
| 2005/0108351 A1 | 5/2005 | Naick et al. | |
| 2005/0114753 A1 * | 5/2005 | Kumar | H04L 41/22 |
| | | | 715/255 |
| 2005/0144569 A1 | 6/2005 | Wilcox et al. | |
| 2005/0144570 A1 | 6/2005 | Loverin et al. | |
| 2005/0144571 A1 | 6/2005 | Loverin et al. | |
| 2005/0144572 A1 | 6/2005 | Wattenberg et al. | |
| 2005/0149858 A1 | 7/2005 | Stern et al. | |
| 2005/0160158 A1 | 7/2005 | Firebaugh et al. | |
| 2005/0223058 A1 | 10/2005 | Buchheit et al. | |
| 2005/0246420 A1 | 11/2005 | Little, II | |
| 2006/0020548 A1 | 1/2006 | Flather | |
| 2006/0123091 A1 | 6/2006 | Ho | |
| 2006/0200523 A1 | 9/2006 | Tokuda et al. | |
| 2006/0248573 A1 | 11/2006 | Pannu et al. | |
| 2006/0271381 A1 | 11/2006 | Pui | |
| 2007/0150513 A1 | 6/2007 | Vanden Heuvel et al. | |
| 2007/0192423 A1 | 8/2007 | Karlson | |
| 2007/0198343 A1 | 8/2007 | Collison et al. | |
| 2007/0233786 A1 | 10/2007 | Rothley | |
| 2008/0114838 A1 | 5/2008 | Taylor | |
| 2008/0270935 A1 | 10/2008 | Wattenberg et al. | |
| 2009/0100009 A1 | 4/2009 | Karp | |
| 2009/0132273 A1 | 5/2009 | Boesch | |

(56) References Cited

U.S. PATENT DOCUMENTS

| | | |
|---|---|---|
| 2009/0222747 A1 | 9/2009 | May et al. |
| 2009/0287780 A1 | 11/2009 | Gawor et al. |
| 2010/0070372 A1 | 3/2010 | Watfa et al. |
| 2010/0166159 A1* | 7/2010 | Katis ............... H04L 12/1822 379/88.13 |
| 2010/0274628 A1 | 10/2010 | Kunz et al. |
| 2010/0306265 A1 | 12/2010 | Jones, III |
| 2011/0099510 A1 | 4/2011 | Wilcox et al. |
| 2011/0131207 A1* | 6/2011 | Jonsson ............... G06Q 10/107 707/730 |
| 2011/0137751 A1 | 6/2011 | Stein et al. |
| 2011/0166939 A1 | 7/2011 | Junkin et al. |
| 2011/0209159 A1 | 8/2011 | Baratz et al. |
| 2011/0246361 A1 | 10/2011 | Geering |
| 2011/0279459 A1* | 11/2011 | Hohpe ................... G06T 11/60 345/467 |
| 2012/0047460 A1* | 2/2012 | McCann ............. G06F 3/04812 715/809 |
| 2012/0179502 A1 | 7/2012 | Farooq et al. |
| 2012/0253896 A1 | 10/2012 | Killoran, Jr. et al. |
| 2012/0253916 A1 | 10/2012 | Ayloo |
| 2012/0254770 A1* | 10/2012 | Ophir ................... G06F 3/0481 715/752 |
| 2012/0290979 A1* | 11/2012 | Devecka ............... H04W 4/206 715/810 |
| 2013/0013456 A1 | 1/2013 | Boesch |
| 2013/0024452 A1 | 1/2013 | Defusco et al. |
| 2013/0041764 A1 | 2/2013 | Donovan et al. |
| 2013/0054354 A1 | 2/2013 | Kunz et al. |
| 2013/0073982 A1* | 3/2013 | Abouyounes ........ G06Q 10/107 715/752 |
| 2013/0174031 A1 | 7/2013 | Constantinou |
| 2013/0227478 A1 | 8/2013 | Rydenhag et al. |
| 2014/0012743 A1 | 1/2014 | Hanson et al. |
| 2014/0143684 A1* | 5/2014 | Oh .......................... H04L 51/04 715/752 |
| 2014/0172628 A1* | 6/2014 | Argue ................. G06Q 30/0261 705/26.8 |
| 2014/0289258 A1* | 9/2014 | Joshi .................... G06Q 10/107 707/741 |

FOREIGN PATENT DOCUMENTS

| | | |
|---|---|---|
| EP | 1077417 | 2/2001 |
| EP | 1232434 | 8/2002 |
| JP | 8286871 | 11/1996 |
| JP | 09326822 | 12/1997 |
| JP | 2001325296 | 11/2001 |
| JP | 2003271526 | 9/2003 |
| KR | 20020050785 | 6/2002 |
| WO | WO9724684 | 7/1997 |
| WO | WO0123995 | 4/2001 |
| WO | WO2011049399 | 4/2011 |

OTHER PUBLICATIONS http://howto.cnet.com/8301-11310_39-57585518-285/how-to-send-money-via-gmail/.
http://www.google.com/wallet/send-money/.
Rohall, Steven L., et al., "Email Visualizations to Aid Communications", IEEE Symposium on Information Visualization, Oct. 22-23, 2001, 5 pages.
Venolia, Gina, et al., "Understanding Sequence and Reply Relationship within Email Converstations: A Mixed-Model Visualization", Paper: Intergrating Tools and Tasks, vol. No. 5, Issue No. 1, Ft. Lauderdale, Florida, Apr. 5-10, 2003, pp. 361-368.
Pamela Parker. "Google Testing Unique AdWords Format Designed for Gmail," Aug. 18, 2011, Search Engine Land, available at http://web.archive.org/web/20111028150326/http://searchengineland.com/google-testing-unique-adwords-format-designed-for-gmail.
Jason Cornwell, "A preview of Gmails new look," Jun. 30, 2011, The Official Gmail Blog, available at http://web.archive.org/web/20110703043327/http://gmailblog.blogspot.com/2011/06/preview-of-gmails-new-look-html.
http://www.ubiq.com/hypertext/weiser/SciAmDraft3.html.
http://www.johnseelybrown.com/calmtech.pdf.
http://195.248.77.74/~saskia/PhDthesis_SaskiaBakker.pdf.
http://ww.w.journalofvision.org/content/13/2/18.full.
http://laplab.ucsd.edu/articles/Pashler_AttnVisPerception1995.pdf.
https://medium.com/something-like-falling/2cd5eac39700.
Piers Dillon-Scott; "Gmail's new ads are about to invade your inbox". http://sociable.co/web/now-gmail-is-sending-ads-to-you-kind-of/. May 27, 2012.

* cited by examiner

METHODS FOR GENERATING MESSAGE NOTIFICATIONS

BACKGROUND

The disclosure herein relates generally to generating message notifications.

Many users of electronic mail (email) services receive a large number of email messages on a daily basis. In many cases, users receive email messages that are not relevant to them, and/or email messages that they do not wish to receive. Because of this, many email users spend a significant amount of time managing their email accounts, including assessing messages to determine the relevancy of each message, reading relevant messages, and deleting or ignoring irrelevant and/or unwanted email messages.

It has become common for users to have near-constant access to email via portable electronic devices, such as laptop computers, tablet computers, and computationally-enabled telephones ("smart phones"). Some of these devices output notifications that describe newly-received messages, such as by displaying the name of the sender of the message along with text from the message. Users also receive messages via services other than email, such as text messages (via a protocol such as the SMS protocol), chat messages, social media messages, application-generated messages, and other types of messages. Some portable electronic devices also output notifications regarding these types of messages along with notifications regarding email messages. Compounding the challenges presented by the volume of notifications received by users, emerging technologies such as wearable computing devices including "smart watches" will allow users to be instantly notified when a new email message is received, regardless of the activity that the user is currently engaged in.

SUMMARY

The disclosure relates to generating message notifications.

One aspect of the disclosed embodiments is a method includes accessing, by one or more computers, a message, and identifying, at the one or more computers and based on information contained in the message, at least one topic related to the message. The method also includes identifying, at the one or more computers, a graphical topic indicator based on the at least one topic, and outputting, by the one or more computers and for display, a visual notification regarding the message, wherein the visual notification includes the graphical topic indicator.

Another aspect of the disclosed embodiments is an apparatus that includes one or more processors and one or more memory devices for storing program instructions used by the one or more processors. The program instructions, when executed by the one or more processors, cause the one or more processors to access a message and identify, based on information contained in the message, at least one topic related to the message. The program instructions further cause the one or more processors to identify a graphical topic indicator based on the at least one topic and output, for display, a visual notification regarding the message, wherein the visual notification includes the graphical topic indicator.

Another aspect of the disclosed embodiments is a method that includes accessing, by one or more computers, a message, and identifying, at the one or more computers and based on information contained in the message, a single word related to the message. The method further includes outputting, for display, a notification regarding the message, wherein the notification includes the single word related to the message, and the single word is the only text element included in the notification that is related to the message.

Another aspect of the disclosed embodiments is a method that includes, accessing, by one or more computers, a message, and outputting, for display at a client computing device, a visual notification regarding the message, wherein the visual notification includes a graphical topic indicator, a graphical sender indicator, and does not include text related to the message. The method also includes outputting, subsequent to outputting the visual notification and for display, text related to the message, and accepting as input, during a display time period, a first user input signal. The method also includes removing, from display, the text related to the message in response to passage of the display time period if the first user input signal is not received during the display time period, and removing, from display at the client computing device, the text related to the message in response to receiving a second user input signal, if the first user input signal is received during the display time period.

BRIEF DESCRIPTION OF THE DRAWINGS

The description herein makes reference to the accompanying drawings wherein like reference numerals refer to like parts throughout the several views, and wherein.

DETAILED DESCRIPTION

Current email notifications provide text-based information such as a name of the sender and a subject line for the email message. Because reading is a serial process, meaning that a person's attention must be focused almost completely on the task of reading to accomplish it, these notifications do not provide meaningful information regarding the context of an email that can be understood without diverting the user's attention to the task of reading information such as a sender name and a subject line of the email. The methods taught herein are directed to providing meaningful information regarding a message that can be quickly understood by a user by glancing briefly at the notification. In some implementations, the methods taught herein identify a topic based on information in the email message, and output for display a visual notification that includes a graphical topic indicator that corresponds to the topic.

Figure 1:
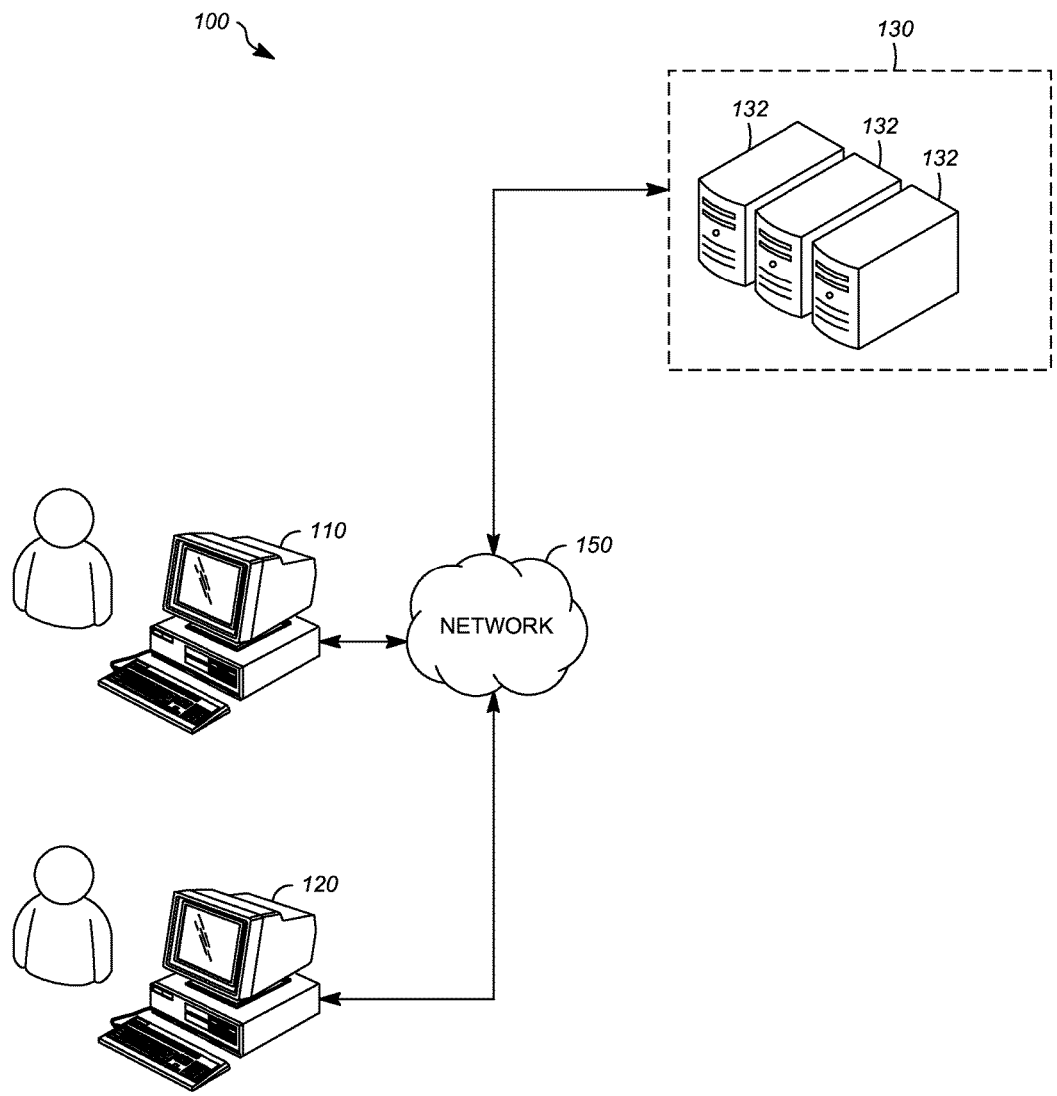
FIG. 1 is a block diagram showing an example of a computing environment.

FIG. 1 shows a computing environment 100 in which a system for generating message notifications can be implemented. The computing environment 100 can include a user system 110, a sender system 120, and a message service 130. The user system 110 and the sender system 120 are each representative of a large number (e.g. millions) of user systems and sender systems that can be included in the computing environment 100. The user system 110 and the sender system 120 can each be any manner of computer or computing device, such as a desktop computer, a laptop computer, a tablet computer, or a smart-phone (a computationally-enabled mobile telephone). The message service 130 can be implemented using one or more server computers 132. As used herein, the term "server computer" means any computing device that can receive a request from another computing device and transmit a response to the request. The user system 110, the sender system 120, and the message service 130 can each be implemented as a single system, multiple systems, distributed systems, or in any other form.

The systems, services, servers, and other computing devices described herein are in communication via a network 150. The network 150 can be one or more communications networks of any suitable type in any combination, including wireless networks, wired networks, local area networks, wide area networks, cellular data networks, and the internet.

The message service 130 provides a service that transmits messages to the user system 110. The description herein will be made with respect to a web-based email service that can provide a web-browser-based interface for viewing mailboxes and email messages. It should be understood, however, that the email service can be provided in many other forms, such as in the form of an "app" that is executed by a tablet computer, a smart-phone or other portable electronic device, or in the form of desktop software that is executed by a personal computer.

Figure 2:
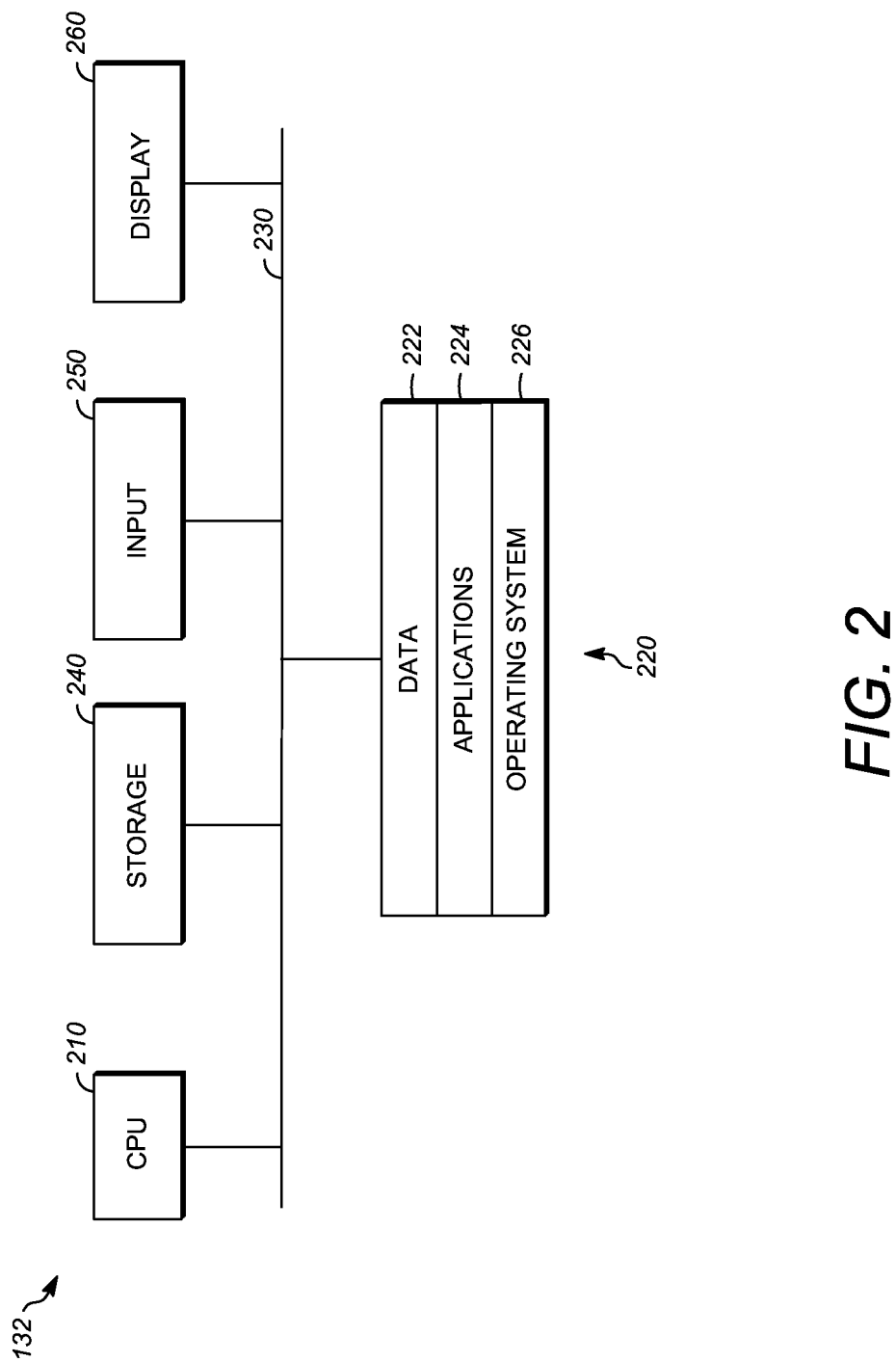
FIG. 2 is a block diagram showing an example of a client computing device.

FIG. 2 is a block diagram of an example of a hardware configuration for the one or more server computers 132 of the message service 130. The same hardware configuration or a similar hardware configuration can be used to implement the user system 110, and the sender systems 120. Each server computer 132 can include a CPU 210. The CPU 210 can be conventional central processing units. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 132 can include memory 220, such as a random access memory device (RAM). Any other suitable type of storage device can be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described herein.

A storage device 240 can be optionally provided in the form of any suitable computer readable medium, such as a hard disc drive, a memory device, a flash drive or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as liquid crystal display (LCD) or a cathode-ray tube (CRT), allows output to be presented to a user, for example, in response to receiving a video signal.

Although FIG. 2 depicts the CPU 210 and the memory 220 of each server computer 132 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 132 can be composed of multiple buses. Further, the storage device 240 can be directly coupled to the other components of the respective one of the server computers 132 or can be accessed via a network and can comprise a single integrated unit such as a memory card or multiple units such as multiple memory cards. The one or more server computers can thus be implemented in a wide variety of configurations.

Figure 3:
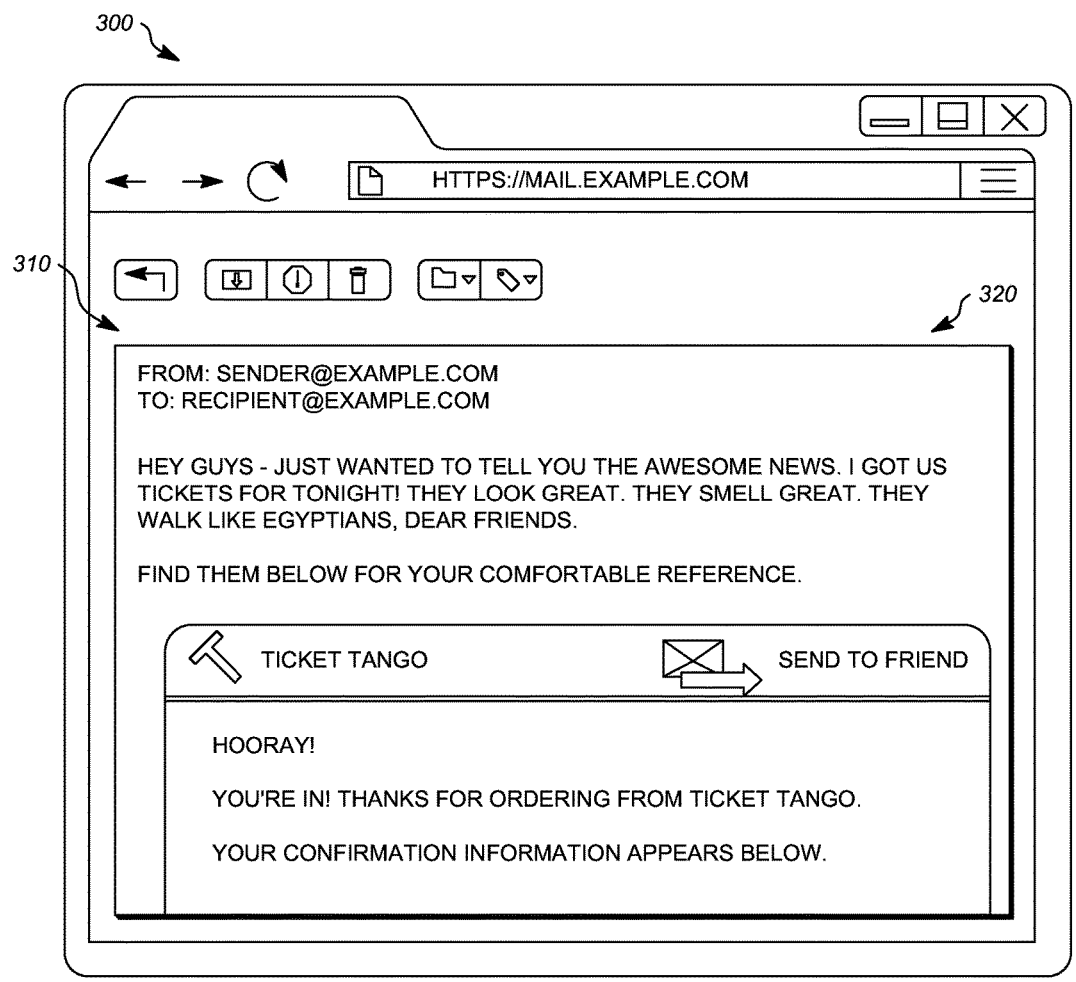
FIG. 3 is an illustration showing an electronic mail interface screen.

FIG. 3 shows a conventional email interface screen 300. The conventional email interface screen 300 is displayed in the context of a web browser and can be, for example, a webpage encoded in a markup language such as HTML that is transmitted from the message service 130 to the user system 110 and output for display at the user system 110.

The conventional email interface screen 300 can include a control area 310 and a message area 320. The control area 310 can include various user operable interface elements, such as buttons, that can be utilized to perform actions with respect to an email message that is displayed within the message area 320. The message area 320 can display information corresponding to an email message, such as a name of a sender of the email message, a subject line for the email message, and a message body for the email message including text and/or images, which can be in plain text format or in a rich format, such as HTML.

In the illustrated example the email message that is displayed within the message area 320 of the conventional email interface screen indicates that the sender of the message has purchased a ticket for an event on behalf of the recipient of email message.

Figure 4:
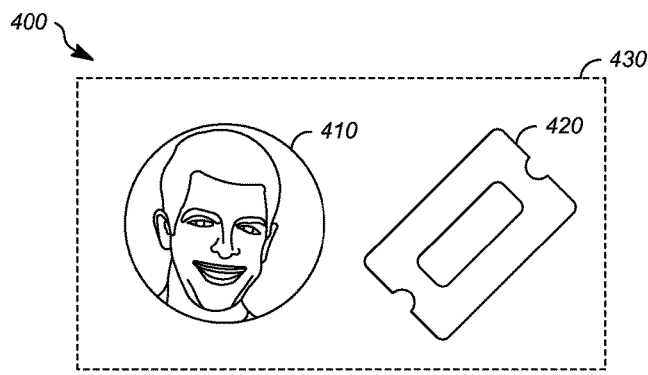
FIG. 4 is an illustration showing a message notification according to a first example.

FIG. 4 is an illustration showing a message notification 400 according to a first example. The message notification 400 is a visual notification regarding a message. In this example, the message notification 400 is a visual notification regarding the email message that is displayed within the message area 320 of the conventional email interface screen 300. The message notification 400 can include a graphical sender indicator 410, and a graphical topic indicator 420. The graphical sender indicator 410 and the graphical topic indicator 420 can be displayed against a solid background color within a bounded area 430. The bounded area 430 indicates an area in which the message notification appears to the exclusion of other content, screen elements, interface elements, or other notifications. Thus, in the illustrated example, the graphical sender indicator 410 and the graphical topic indicator 420 are the only elements present within the bounded area 430. In FIG. 4, the bounded area 430 is indicated by a dashed line. It should be understood that this dashed line is included in the figure for the purpose of indicating the extents of the bounded area 430, but is not necessarily output for display as part of the message notification 400.

The graphical sender indicator 410 is a graphical element that is associated with a sender of the message to which message notification 400 corresponds. The graphical sender indicator can be any image or symbol that is chosen to represent the sender of the message. In some implementations, the graphical sender indicator 410 for a particular sender is chosen by the recipient of the message. In other implementations, the graphic element selected for the graphical sender indicator 410 is selected by the sender. In the illustrated example, the graphical sender indicator 410 is a photograph representing the sender of the message, and is displayed within a circular area. Other types of images, symbols, and shapes can be utilized in forming the graphical sender indicator 410.

The graphical topic indicator 420 represents a topic that is related to the message. The graphical topic indicator 420 can be any type of graphic, symbol or other visual element that is representative of at least one topic related to the message. In the illustrated example, the graphical topic indicator 420 is an icon representing a ticket and is based on information contained in the email message depicted within the message area 320 of the conventional email interface screen 300. The graphical element that is selected as the graphical topic indicator 420 is dependent upon information contained within the message to which the message notification 400 relates. The graphical topic indicator 420 can be, as example, an icon, an emoji, or a photographic image. Graphical elements in any suitable format can be used as the graphical topic indicator 420, such as raster formats and vector formats. In one implementation, as illustrated in FIG. 4, the graphical topic indicator 420 is a single-color icon that is displayed against a solid background color that is present within the bounded area 430.

Figure 5:
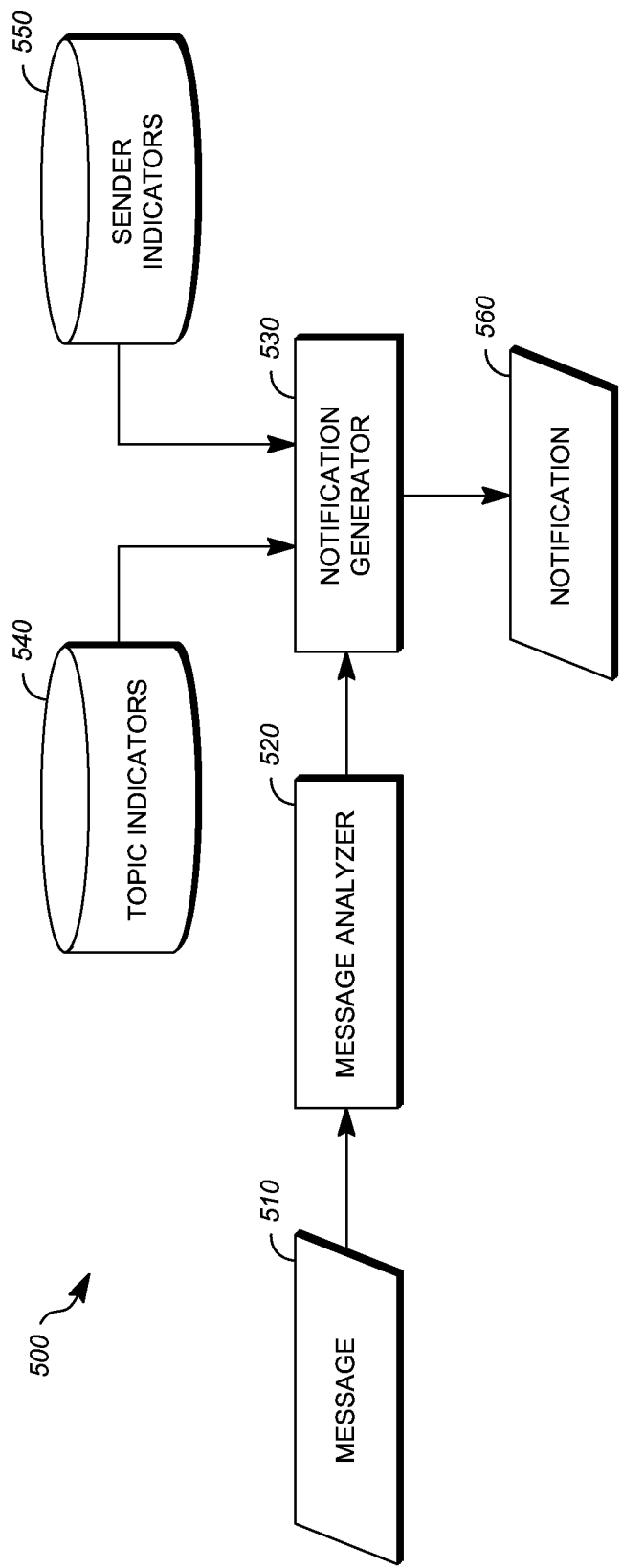
FIG. 5 is a block diagram showing generation of the message notification according to the first example.

FIG. 5 is a block diagram showing a system 500 for generating a message notification. The system 500 can be utilized to generate message notifications, such as the message notification 400 as well as other message notifications that will be described herein.

A message 510 is provided as an input to a message analyzer 520. The message 510 can be any manor of message, such as an email message, a text message, a chat message, a social media message, an application generated message, or any other type of message that can be delivered output for display at a computing device, such as the user system 110.

The message analyzer 520 is operable to analyze the message 510 and identify at least one topic that is related to the message 510. The analysis performed by the message analyzer 520 can be based on any or all of the identity of the sender of the message, the subject line of the message 510, the body of the message 510, metadata transmitted with the message 510, or any other type of information associated with the message 510. Any system, method, or algorithm now known or later developed can be utilized to identify the at least one topic related to the message 510 by the message analyzer 520. As a first example, the message analyzer 520 can compare the message to known message profiles. This type of system is well suited to automatically generated email messages, such as email messages confirming airline bookings, email messages containing receipts for online purchases, and shipping notifications regarding goods ordered by the recipient. Another type of algorithm that can be applied to identify at least one topic related to the message is a semantic analysis algorithm that identifies and ranks concepts that are contained within the text associated with the message, such as in a subject line and message body of an email message. Such an algorithm could return a ranked set of key words, responding to one or more topics that are associated with the message. Then, for example, the highest ranked topic could be selected for use in generating a notification, as will be described further herein. Other examples of methods that can be used to analyze a message by the message analyzer 520 include keyword frequency analysis within the text of the message 510, a machine learning classification model, and a classification model that utilizes filters that are associated with an email account or other messaging account that is associated with the user.

As an output, the message analyzer provides information identifying at least one topic related to the message to a notification generator 530. The notification generator 530 can also receive other information related to the message, including an identity of the sender of the message 510. The notification generator 530 can utilize the information identifying the at least one topic associated with the message 510 to identify a graphical topic indicator. In particular, the notification generator 530 can access a plurality of stored topic indicators 540, and select an appropriate topic indicator from the plurality of topic indicators 540 using the information received from the message analyzer 520. For example, a plurality of topic indicators 540 can be graphical elements that are stored in association with metadata describing one or more topics that each graphical element corresponds to. The notification generator 530 selects one of the topic indicators 540 based on a match between the at least one topic that was identified by the message analyzer 520 and information associated with the topic indicators 540, such as an exact match of the topic identified by the message analyzer 520 and a topic described by metadata associated with one of the topic indicators 540. The notification generator can further identify a graphical sender indicator. For example, the graphical sender indicator can be selected based on the identity of the sender of the message 510. In one implementation, a plurality of sender indicators 550 are scored in association with metadata describing an identity of a person associated with each of the sender indicators 550. The notification generator can determine whether a match is found, and if so, select the matching one of the sender indicators 550 for inclusion in a notification. Using the topic indicator selected from the plurality of topic indicators 540 and the sender indicator that was selected from a plurality of sender indicators 550, the notification generator 530 can output the notification 560 including a graphical type of indicator and a graphical sender indicator.

If the notification generator 530 is not able to identify a matching graphical topic indicator from the plurality of topic indicators 540, the notification 560 can be generated using a text-based indicator, such as a term or phrase identified by the message analyzer 520 as the topic that is associated with the message 510. If the notification generator 530 is not able to identify a graphical sender indicator from the plurality of sender indicators 550, a text-based indicator can be utilized, such as all or part of the sender's name.

The system 500 can be implemented by one or more computing devices. In some implementations, the system 500 is implemented by a single computing device, while in other implementations the system 500 is implemented by multiple computing devices. In one implementation, the system 500 is implemented entirely at the message service 130, and the notification 560 is transmitted to the user system 110 and subsequently output for display at the user system 110. In another implementation, the message 510 is received at the user system 110, and the system 500 is implemented entirely at the user system 110. In another implementation, the message 510 is received at the user system 110, the message analyzer 520 is executed at the user system 110, and the notification generator 530 is executed at the message service 130 based on information transmitted to the message service 130 from the user system 110 as a result of execution of the message analyzer 520 at the user system 110. In this implementation, the plurality of topic indicators 540 and the plurality of sender indicators 550 can be located at the message service 130. In another implementation, the notification generator can be implemented in part at the message service 130 and in part at the user system 110. For example, the graphical topic indicator can be identified at the message service 130 using the plurality of topic indicators 540 stored at the message service 130, while the graphical sender indicator is identified by the notification generator 530 executed at the user system 110 with the plurality of sender indicators 550 being stored at the user system 110.

Figure 6:
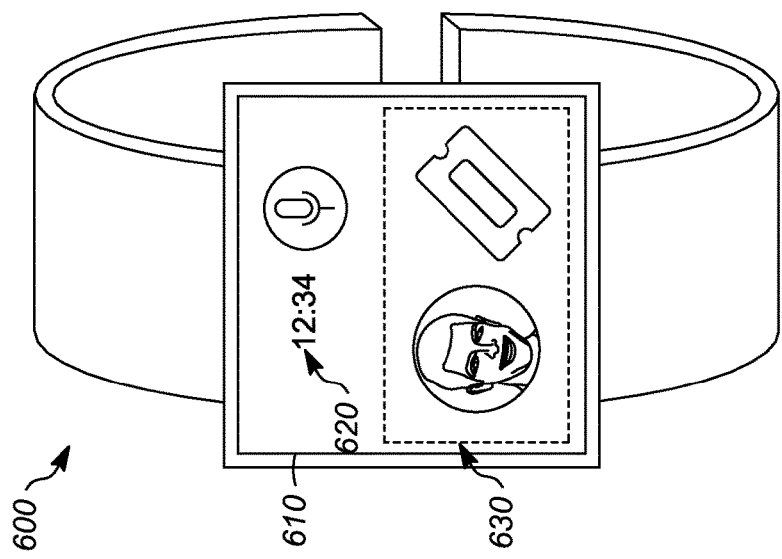
FIG. 6 is an illustration showing the message notification according to the first example as part of a first interface screen that is output for display at smart watch client device.

FIG. 6 is an illustration showing a message notification that is output for display at a user system in the form of a smart watch 600. The smart watch 600 includes a display screen 610 having a display area. An interface is output for display at the display screen 610 and includes interface elements 620 and a message notification 630. The message notification 630 is similar to the message notification 400 as previously described, and is located within a rectangular are of the display screen 610, with the interface elements 620 being positioned outside of the area in which message notification 630 is displayed. In this example, the message notification 630 can be output for display at the display screen 610 such that the bounded area (i.e. the area not occupied by other interface elements such as the interface elements 620) occupies a majority of the display area of the display screen 610.

Figure 7:
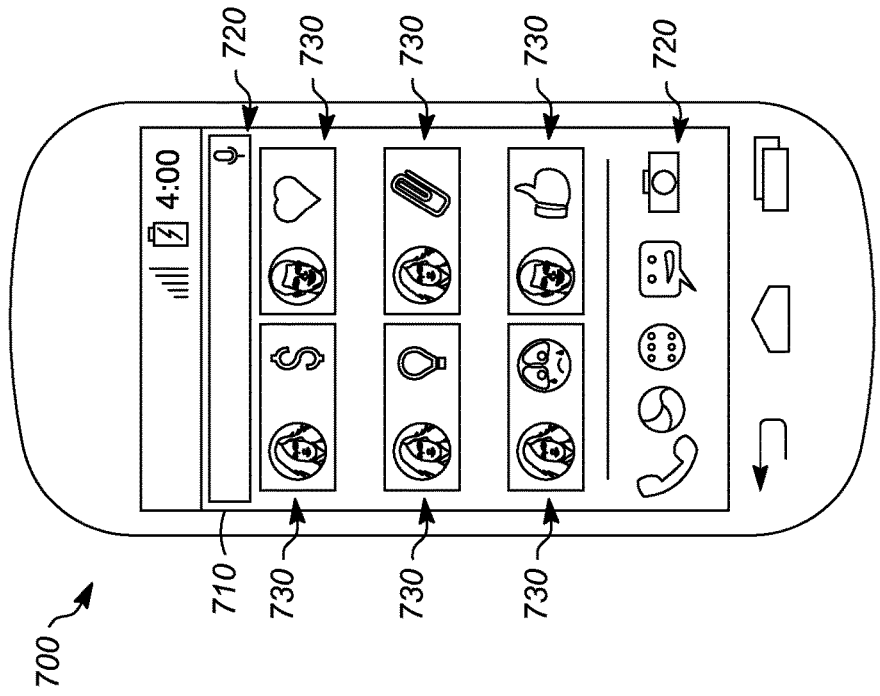
FIG. 7 is an illustration showing the message notification according to the first example as part of a first interface screen that is output for display at smart phone client device.

FIG. 7 is an illustration showing a plurality of message notifications that are output for display in the context of an interface screen at a user device in the form of a smart phone 700 having a display screen 710. The interface screen is output for display at the display screen 710 and includes interface elements 720 as well as a plurality of message notifications 730. The message notifications 730 are similar to the message notifications 400, as previously described. Each of the message notifications 730 occupies a separate distinct area in which only the sender indicator and the topic indicator of the respective message notification are displayed.

Figure 8:
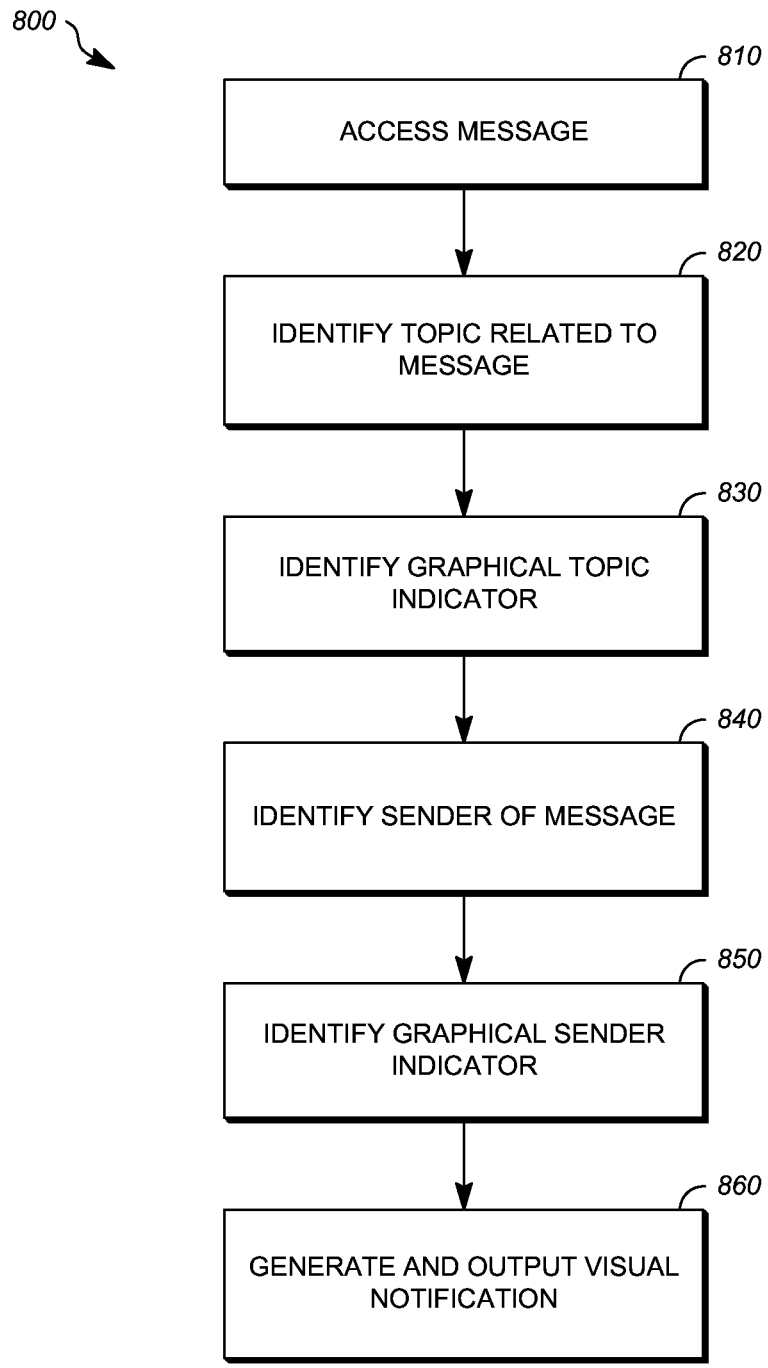
FIG. 8 is a flow chart showing a process for generating the message notification according to the first example.

FIG. 8 is a flow chart showing a process 800 for generating message notifications.

The operations described in connection with the process 800 can be performed at one or more computers, such as at the one or more server computers 132 of the message service 130. When an operation is performed by one or more computers, it is completed when it is performed by one computer. The operations described in connection with the process 800 can be embodied as a non-transitory computer readable storage medium including program instructions executable by one or more processors that, when executed, cause the one or more processors to perform the operations. For example, the operations described in connection with the process 800 could be stored at the memory 220 of a respective one of the server computers 132 and be executable by the CPU 210 thereof.

At operation 810, a message is accessed. A message can be accessed in any suitable manner, such as by receiving the message over a network, retrieving the message from a local memory device, retrieving the message from a remote memory device, retrieving the message from a local storage device, retrieving the message from a remote storage device, by programmatically generating the message, or by any other means in which a message can be made available to a processor, such that the processor is able to perform operations with respect to the message. In one example, a message can be received at the message service 130 from the sender system 120. In another example, the message can be received at the user system 110 from the message service 130.

At operation 820, a least one topic related to the message is identified. The topic related to the message can be identified in any suitable manner. For example, the topic related to the message can be identified in the manner described with respect to the message analyzer 520. In another example, the topic related to the message can be identified by locating, within the message, an explicitly designated topic. The topic related to the message can be identified based on information contained in the message. As one example, identifying the topic related to the message can include semantic analysis of the message.

In operation 830, a graphical topic indicator is identified. In this context, identifying includes any action that will cause a specific graphical topic indicator to be utilized, such as selecting a graphical element as the graphical topic indicator or creating a graphical topic indicator. The graphical topic indicator can be identified based on the at least one topic related to the message, as previously identified in operation 820. In addition, identifying the graphical topic indicator can be performed as described with respect to the notification generator 530.

At operation 840, the sender of the message is identified. In this context, identifying the sender of the message means that a data value is recognized as being descriptive of the identity of the sender. As one example, identifying the sender of a message can include receiving data identifying the sender of the message. As another example, identifying the sender of the message can include analyzing the message to determine, based on the message, the identity of the sender. For example, an email address can be extracted from the message, and compared with previously stored information correlating email addresses to sender identities. As another example, with respect to a text message sent via the SMS protocol, identifying the sender of the message can include receiving a telephone number from which the message originated, and accessing information that correlates the sender identities to telephone numbers. Other methods can be utilized to identify the sender of the message.

At operation 850, a graphical sender indicator is identified. In this context, identifying the graphical sender indicator encompasses any manner in which the graphical sender indicator becomes available for use by the process 800. The graphical sender indicator is identified based on the identity of the sender of the message. As one example, identifying the graphical sender indicator can include comparing the identity of the sender of the message to metadata stored with previously-stored graphical sender indicators. In another example, the graphical sender indicator can be created as needed, for example, based on a previously stored image representing the sender and by manipulating that image in any desired fashion, such as by cropping or compositing. Other examples of identifying a graphical sender indicator are as described previously with respect to the notification generator 530.

At operation 860 a visual notification regarding the message is generated in output. Generating the visual notification can include any manner of creation of data representing the visual notification, accessing a previously-stored visual notification that corresponds to the graphical topic indicator and/or the graphical sender indicator, or transmission of data that represents the visual notification. The visual notification is then output for display, such as at a display screen of a client device. In one example, the visual notification is output for display by transmitting information representing the visual notification from a server computer to a client device. In another example, the visual notification is output for display by transmission of data representing the visual notification from a processor at a client device to a display screen associated with the client device.

Figure 9:
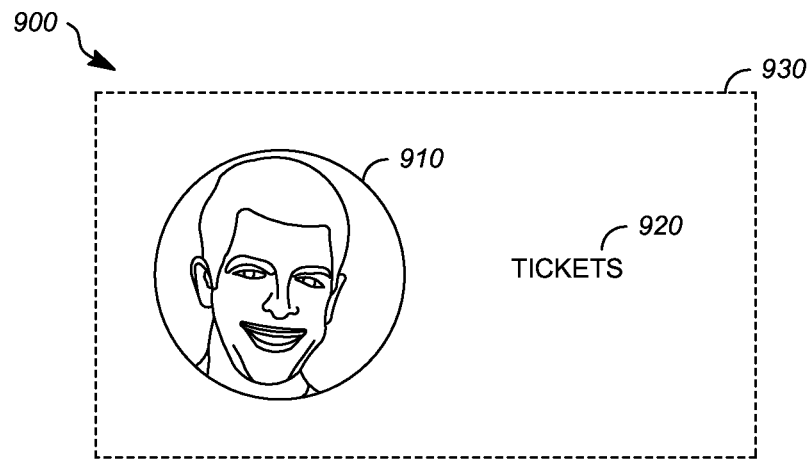
FIG. 9 is an illustration showing a message notification according to a second example.
Figure 10:
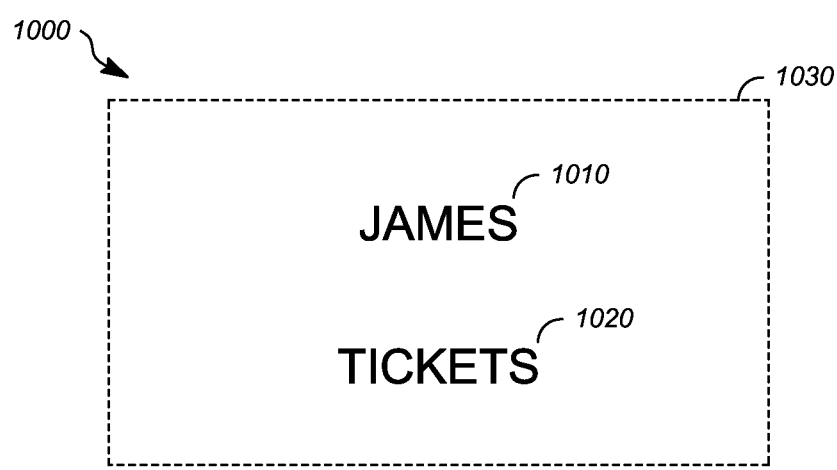
FIG. 10 is an illustration showing a message notification according to a third example.

In some implementations, one or more of the operations described with respect to the process 800 can be omitted. As one example, operation 830 can be omitted, resulting in the generation of a message notification 900 according to a second example in which a graphical user indicator 910 and a test based topic indicator 920 are displayed within a bounded area 930, as shown in FIG. 9. In another example, operation 830 and operation 850 can both be omitted resulting in generation of a message notification 1000 according to a third example and which a text-based sender indicator 1010 and a text-based topic indicator 1020 are displayed within a bounded area 1030, as shown in FIG. 10. In another example, operations 840 and 850 can be omitted, resulting in a notification in which a graphical topic indicator is display with or without a text-based sender indicator or a graphical sender indicator.

Figure 11A:
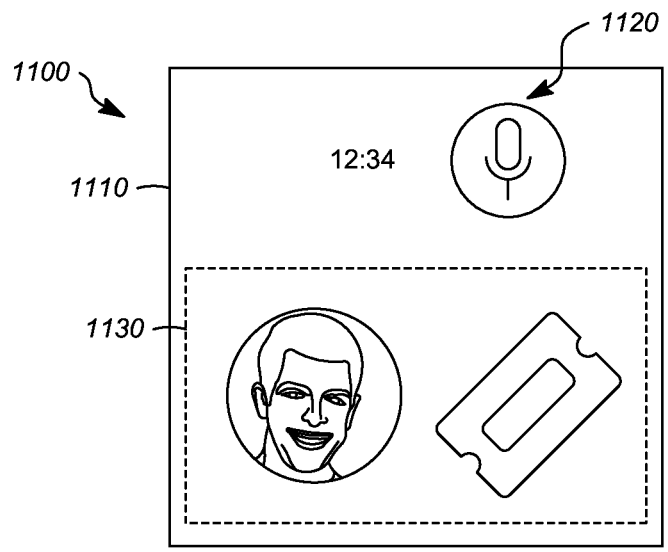
FIGS. 11A-11D are illustrations showing a message notification and a momentary message preview according to a fourth example.
Figure 11B:
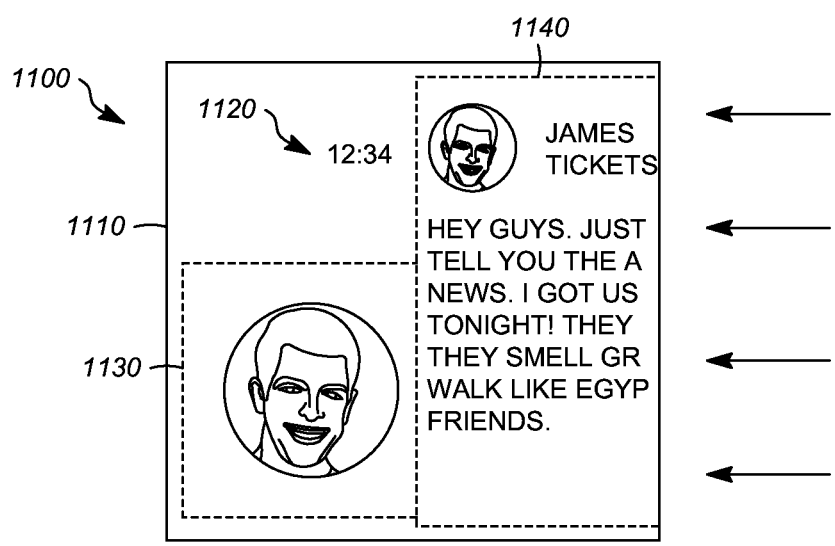
Figure 11C:
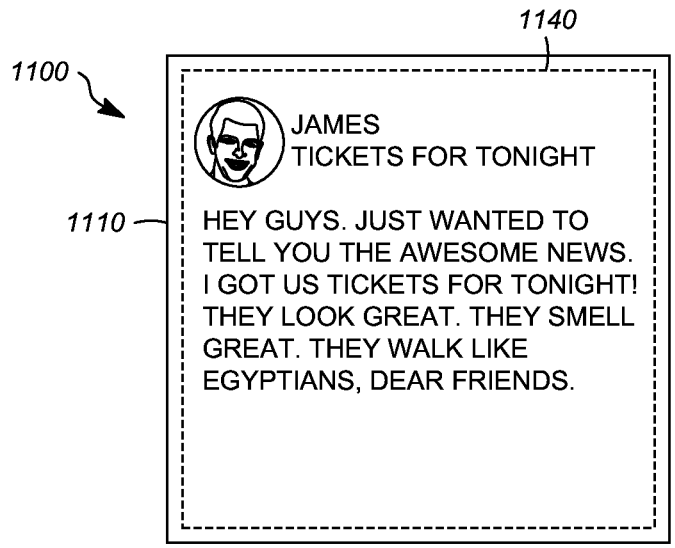
Figure 11D:
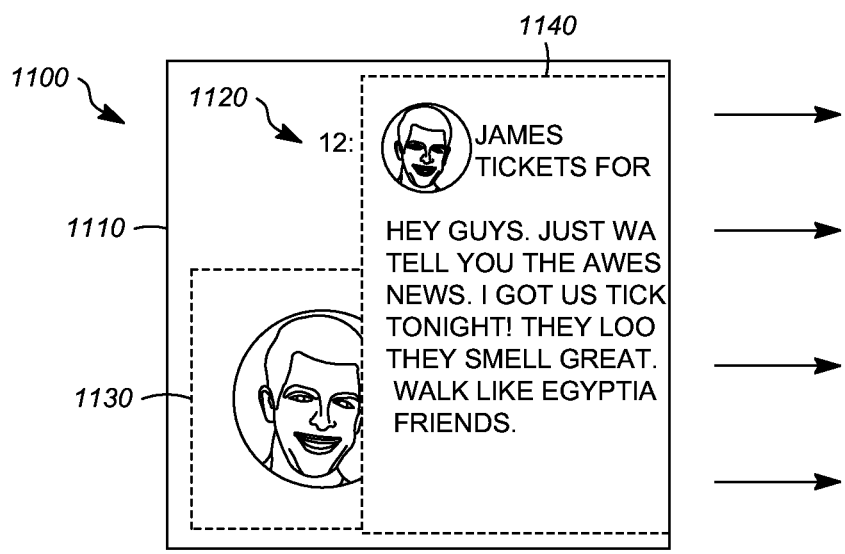

FIGS. 11A-11D are illustrations showing an interface screen 1100 that can be output for display at a display screen 1110 of a client device according to a fourth example. When a message is received, a message notification 1130 is displayed along with one or more interface elements for the interface screen 1100, as shown in FIG. 11A. The message notification 1130 includes a graphical sender indicator and a graphical topic indicator, as described with respect to the message notification 400 of FIG. 4, but it should be understood that other message notifications can be utilized in place of the message notification 1130, such as the other examples of message notifications discussed herein. Subsequent to the initial display of the message notification 1130, a message representation 1140 is output for display as part of the interface screen 1100. The message representation includes text related to the message, such as at least a portion of the subject of the message and/or at least a portion the body of the message. In the illustrated example, the message representation 1140 enters the screen from an edge thereof with an animated sliding transition, as shown in FIG. 11B, before fully occupying the screen and obstructing view of the interface elements 1120 and the message notification 1130, as shown in FIG. 11C. The message representation 1140 can be removed from display at the interface screen 1100 in response to passage of time, and interface action performed by the user such as a tap, a click, or a gesture input, or the message representation 1140 can be removed in response to satisfaction of any other criteria.

Figure 12:
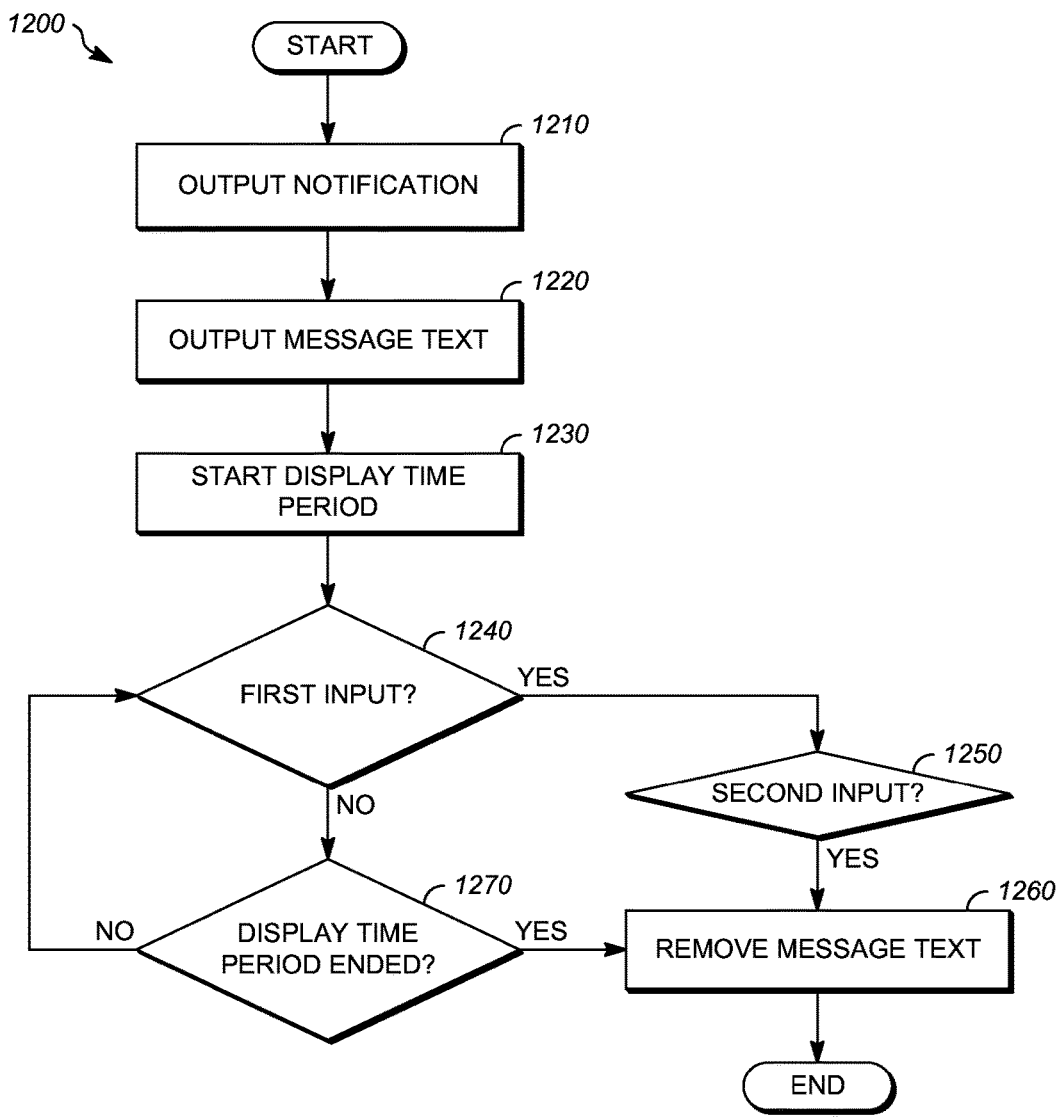
FIG. 12 is a flow chart showing a process for displaying the message notification and the momentary message preview according to the fourth example.

FIG. 12 is a flowchart showing a process 1200 for displaying the message notification and the momentary message preview according to the fourth example. The operations described in connection with the process 1200 can be performed at one or more computers, such as at the one or more server computers 132 of the message service 130. When an operation is performed by one or more computers, it is completed when it is performed by one computer. The operations described in connection with the process 1200 can be embodied as a non-transitory computer readable storage medium including program instructions executable by one or processors that, when executed, cause the one or more processors to perform the operations. For example, the operations described in connection with the process 1200 could be stored at the memory 220 of a respective one of the server computers 132 and be executable by the CPU 210 thereof.

At operation 1210 a message notification is output, such as described with respect to the message notification 1130 of FIG. 11A. At operation 1220, a text related to the message is output for display. For example, a text related to the message can be output for display as described with respect to the message representation 1140 of FIGS. 11B-11D.

At operation 1230, a display time period is started. The display time period can be started at the time when the text related to the message is output for display at operation 1220. The display time period can be a predetermined display time, or can be a time period that is determined based on any relevant criteria.

At operation 1240, the text related to the message is currently being displayed, and a determination is made as to whether a first input is received. The first input can be any many of user input made by any type of user input device, such as a touch at a touch screen, a gesture at a touch screen, a click by a mouse, or a key press at a keyboard. If the first input is received while the text related to the message is displayed, the process proceeds to operation 1250. At operation 1250 a determination is made as to whether a second input is received, where the second input can be in any suitable form as described with respect to the first input at operation 1240. When the second input is received at operation 1250, the process advances to operation 1260 where the text related to the message is removed from display, such as described with respect to FIG. 11D. Accordingly, after the first input has been received at operation 1240, the text related to the message continues to be displayed until the second input is received at operation 1250, at which point it is removed at operation 1260.

If, at operation 1240, the first input is not received the process advances to operation 1270 where it is determined whether the display time period has ended. If the display time period has not ended the process returns to operation 1240 such that the first input can still be received until the display time period has ended. If, at operation 1270, it is determined that the display time period has ended, the process advances to operation 1260 where the text related to the message is removed from display, as previously noted.

In the process 1200, the visual notification is output for display followed by text related to the message which is displayed for a brief period of time unless the first input is received. If the first input is received, display of the text related to the message is continued until the second input is received.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method comprising:
   accessing, by one or more computers, a message sent by a sender to a receiver;
   identifying, by the one or more computers and based on information contained in the message, a topic descriptive of the message, the topic descriptive of the message not identified based on an input from the sender or the receiver;
   identifying, by the one or more computers, a graphical topic indicator based on the topic, the graphical topic indicator not identified based on an input from the sender or the receiver;
   identifying, by the one or more computers and based on information contained in the message, the sender of the message;
   identifying, by the one or more computers, a graphical sender indicator that is associated with the sender;

outputting, by the one or more computers for visualization on a display device of the receiver, a visual notification regarding the message, wherein the visual notification includes the graphical topic indicator and the graphical sender indicator,
  is separate from the message,
  is disposed within first display element that is a bounded area, wherein the graphical topic indicator and the graphical sender indicator are the only elements displayed within the bounded area, and
  does not include text fragments from the message;
outputting, by the one or more computers on the display device of the receiver, the message in a message representation that is a second display element separate from the visual notification, wherein the message representation is output without receiving an input from the receiver to display the message and while the visual notification is displayed; and
removing, by the one or more computers from the display device of the receiver, the message representation in response to passage of a display time period for the message representation.

2. The method of claim 1, wherein identifying the topic descriptive of the message includes semantic analysis of the message.

3. The method of claim 1, wherein the graphical topical indicator is an icon.

4. The method of claim 3, wherein the icon is a single-color icon.

5. The method of claim 1, wherein identifying the graphical topic indicator based on the topic includes accessing metadata associated with stored graphical elements and selecting one of the stored graphical elements as the graphical topic indicator based on a comparison of the topic descriptive of the message and the metadata associated with the stored graphical elements.

6. The method of claim 1, wherein the display device has a display area and the bounded area occupies a majority of the display area.

7. An apparatus, comprising:
  one or more processors; and
  one or more memory devices for storing program instructions used by the one or more processors, wherein the program instructions, when executed by the one or more processors, cause the one or more processors to:
    access an email message sent by a sender to a receiver;
    identify, based on information contained in the email message, a topic descriptive of the email message, the topic descriptive of the email message not identified based on an input from the sender or the receiver;
    identify a graphical topic indicator based on the topic, the graphical topic indicator not identified based on an input from the sender or the receiver;
    identify a graphical sender indicator that is associated with the sender of the email message;
    output, for visualization on a display device of the receiver, a visual notification regarding the email message, wherein the visual notification
      includes the graphical topic indicator and the graphical sender indicator,
      is separate from the email message,
      is disposed within first display element that is a bounded area, wherein the graphical topic indicator and the graphical sender indicator are the only elements displayed within the bounded area, and
      does not include text fragments from the email message;
    output, on the display device of the receiver, the email message in a message representation that is a second display element, wherein the email message is output without receiving an input from the receiver to display the email message and while the visual notification is displayed; and
    remove, from display at the display device of the receiver, the message representation in response to passage of a display time period for the email message.

8. The apparatus of claim 7, wherein the instructions cause the one or more processors to identify the topic descriptive of the email message by semantic analysis of the email message.

9. The apparatus of claim 7, wherein the graphical topical indicator is an icon.

10. The apparatus of claim 9, wherein the icon is a single-color icon.

11. The apparatus of claim 7, wherein the instructions cause the one or more processors to identify the graphical topic indicator based on the topic by accessing metadata associated with stored graphical elements and selecting one of the stored graphical elements as the graphical topic indicator based on a comparison of the topic descriptive of the email message and the metadata associated with the stored graphical elements.

12. The apparatus of claim 7, wherein the display device has a display area and the bounded area occupies a majority of the display area.

13. A method comprising:
  accessing, by one or more computers, a message;
  outputting, for display at a client computing device, a visual notification descriptive of the message, wherein the visual notification
    is separate from the message,
    consists of a graphical topic indicator, a graphical sender indicator,
    does not include text from the message, and
    is disposed within first display element that is a bounded area, wherein the graphical topic indicator and the graphical sender indicator are the only elements displayed within the bounded area;
  outputting the message in a second display element for display at the client computing device, subsequent to outputting the visual notification for display, without receiving an input from the client computing device to display the message, and while the visual notification is displayed;
  in response to not receiving a first user input during a display time period, removing, from display at the client computing device, the second display element in response to passage of the display time period; and
  in response to receiving the first user input during the display time period, removing, from display at the client computing device, the second display element in response to receiving a second user input signal.

14. The method of claim 1, wherein identifying the topic descriptive of the message is based on comparing the message to known message profiles.

* * * * *